(12) United States Patent
Muralidharan et al.

(10) Patent No.: US 9,617,189 B2
(45) Date of Patent: Apr. 11, 2017

(54) APPARATUS AND METHOD FOR MATERIALS PROCESSING UTILIZING A ROTATING MAGNETIC FIELD

(71) Applicant: UT-Battelle, LLC, Oak Ridge, TN (US)

(72) Inventors: Govindarajan Muralidharan, Knoxville, TN (US); Joseph A. Angelini, Knoxville, TN (US); Bart L. Murphy, Friendsville, TN (US); John B. Wilgen, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 364 days.

(21) Appl. No.: 14/015,490

(22) Filed: Aug. 30, 2013

(65) Prior Publication Data

US 2015/0064360 A1 Mar. 5, 2015

(51) Int. Cl.
*C04B 37/00* (2006.01)
*C04B 37/02* (2006.01)
*H01F 41/02* (2006.01)

(52) U.S. Cl.
CPC ....... *C04B 37/021* (2013.01); *H01F 41/0273* (2013.01); *C04B 2237/385* (2013.01);
(Continued)

(58) Field of Classification Search
None
See application file for complete search history.

(56) References Cited

U.S. PATENT DOCUMENTS 4,518,627 A * 5/1985 Foley et al. ................. 427/549
5,089,356 A * 2/1992 Chung ............... B23K 35/0222
228/248.1
(Continued)

FOREIGN PATENT DOCUMENTS

CN 102007639 A 4/2011
GB 856999 12/1960
(Continued)

OTHER PUBLICATIONS

Merriam Webster online definition of "concomitant" <http://www.merriam-webster.com/dictionary/concomitant> accessed on Dec. 26, 2015.*
(Continued)

*Primary Examiner* — Mandy Louie
(74) *Attorney, Agent, or Firm* — Brinks Gilson & Lione

(57) ABSTRACT

An apparatus for materials processing utilizing a rotating magnetic field comprises a platform for supporting a specimen, and a plurality of magnets underlying the platform. The plurality of magnets are configured for rotation about an axis of rotation intersecting the platform. A heat source is disposed above the platform for heating the specimen during the rotation of the plurality of magnets. A method for materials processing utilizing a rotating magnetic field comprises providing a specimen on a platform overlying a plurality of magnets; rotating the plurality of magnets about an axis of rotation intersecting the platform, thereby applying a rotating magnetic field to the specimen; and, while rotating the plurality of magnets, heating the specimen to a desired temperature.

8 Claims, 9 Drawing Sheets

(52) U.S. Cl.
CPC .... *C04B 2237/40* (2013.01); *C04B 2237/402* (2013.01); *C04B 2237/765* (2013.01); *C04B 2237/84* (2013.01)

(56) References Cited

U.S. PATENT DOCUMENTS

| | | | | |
|---|---|---|---|---|
| 5,424,119 | A * | 6/1995 | Phillips et al. | 428/328 |
| 6,143,140 | A * | 11/2000 | Wang | C23C 14/046 204/192.12 |
| 6,833,107 | B2 | 12/2004 | Kuriyama et al. | |
| 6,902,807 | B1 * | 6/2005 | Argoitia et al. | 428/403 |
| 2002/0160194 | A1 * | 10/2002 | Phillips | B41M 3/14 428/403 |
| 2005/0133572 | A1 * | 6/2005 | Brese | B23K 3/0638 228/180.22 |
| 2009/0212554 | A1 * | 8/2009 | Lewis | B41M 3/14 283/85 |
| 2010/0021658 | A1 * | 1/2010 | Raksha et al. | 427/598 |
| 2010/0040799 | A1 * | 2/2010 | Raksha et al. | 427/550 |
| 2012/0042993 | A1 * | 2/2012 | Ripley | C21D 9/00 148/513 |
| 2013/0272780 | A1 * | 10/2013 | Takeuchi | C09J 5/06 403/270 |
| 2015/0064360 | A1 * | 3/2015 | Muralidharan et al. | 427/487 |

FOREIGN PATENT DOCUMENTS

| | | |
|---|---|---|
| JP | 61059713 A | 3/1986 |
| JP | 61123010 A | 6/1986 |
| JP | 09256150 A | 9/1997 |
| JP | 2003268535 A | 9/2003 |
| JP | 2007145629 A | 6/2007 |
| JP | 4717412 B9 | 4/2011 |
| WO | WO 2010/100082 A2 | 9/2010 |

OTHER PUBLICATIONS

Groza, Joanna R. et al., "Sintering activation by external electrical field," *Materials Science and Engineering*, A287 (2000) pp. 171-177.

Munir, Z. A. et al., "The effect of electric field and pressure on the synthesis and consolidation of materials: A review of the spark plasma sintering method," *Journal of Materials Science*, 41 (2006) pp. 763-777.

* cited by examiner

US 9,617,189 B2

APPARATUS AND METHOD FOR MATERIALS PROCESSING UTILIZING A ROTATING MAGNETIC FIELD

FEDERALLY SPONSORED RESEARCH OR DEVELOPMENT

This invention described in this disclosure arose in the performance of prime contract number DE-AC05-00OR22725 between UT-Battelle, LLC and the U.S. Department of Energy. The government has certain rights in the invention.

TECHNICAL FIELD

The present disclosure is related generally a system for materials processing and more particularly to system for applying a rotating magnetic field to a specimen while heating the specimen.

BACKGROUND

There is significant evidence that electric and magnetic fields influence the thermodynamics and kinetics of materials behavior. Electric fields have been shown to have an effect on numerous phenomena, including low-angle grain boundary motion in ionic crystals, sublimation of alkali halide crystals, phase transformation in alloys, plastic deformation in metals and ceramics, hardenability of steel, microstructural development in alloys, metal nuclei growth on ceramic substrates, wave dynamics of self-propagating reactions, nucleation of nanocrystallites in bulk metallic glasses, nucleation and growth of intermetallics and ceramic phases, and impregnation of ceramics or glasses with nanocrystalline particles to form functionally-graded materials. Large magnetic fields have been shown to modify solid-solid and solid-liquid phase equilibria, while microwave energy has been used to accelerate particle sintering kinetics. While various methodologies have been developed for bulk and particulate materials processing, it would be advantageous to develop a magnetic processing technique for planar and/or roll-to roll processing of thin films, thick films, and coatings.

BRIEF SUMMARY

An apparatus for materials processing utilizing a rotating magnetic field comprises a platform for supporting a specimen, and a plurality of magnets underlying the platform. The plurality of magnets are configured for rotation about an axis of rotation intersecting the platform. A heat source is disposed above the platform for heating the specimen during the rotation of the plurality of magnets.

A method for materials processing utilizing a rotating magnetic field comprises providing a specimen on a platform overlying a plurality of magnets; rotating the plurality of magnets about an axis of rotation intersecting the platform, thereby applying a rotating magnetic field to the specimen; and, while rotating the plurality of magnets, heating the specimen to a desired temperature.

DETAILED DESCRIPTION

Figure 1:
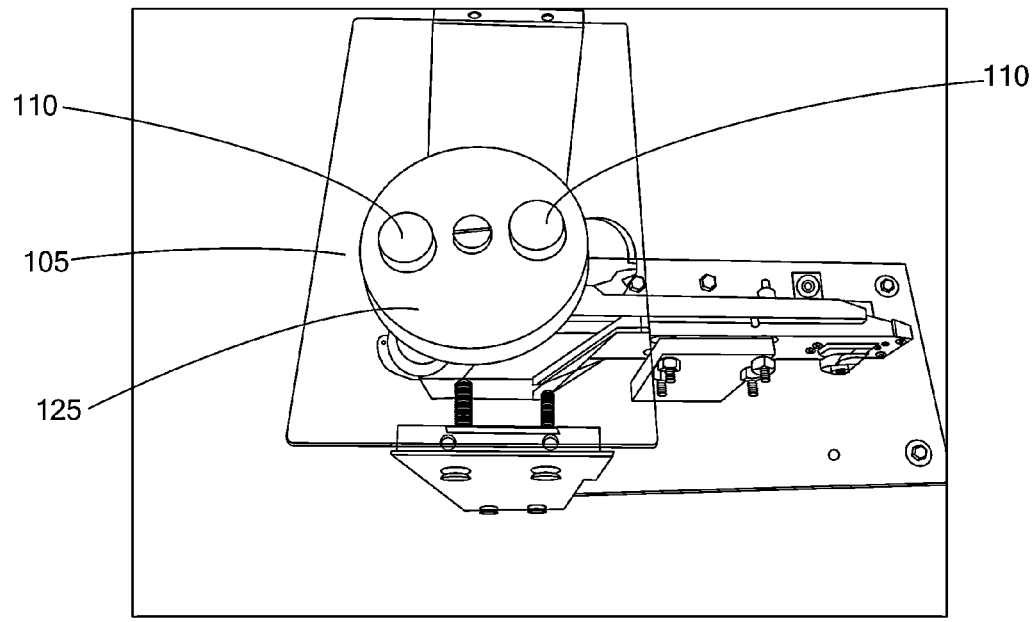
FIG. 1 is a view of an exemplary apparatus for materials processing according to the present disclosure.
Figure 2:
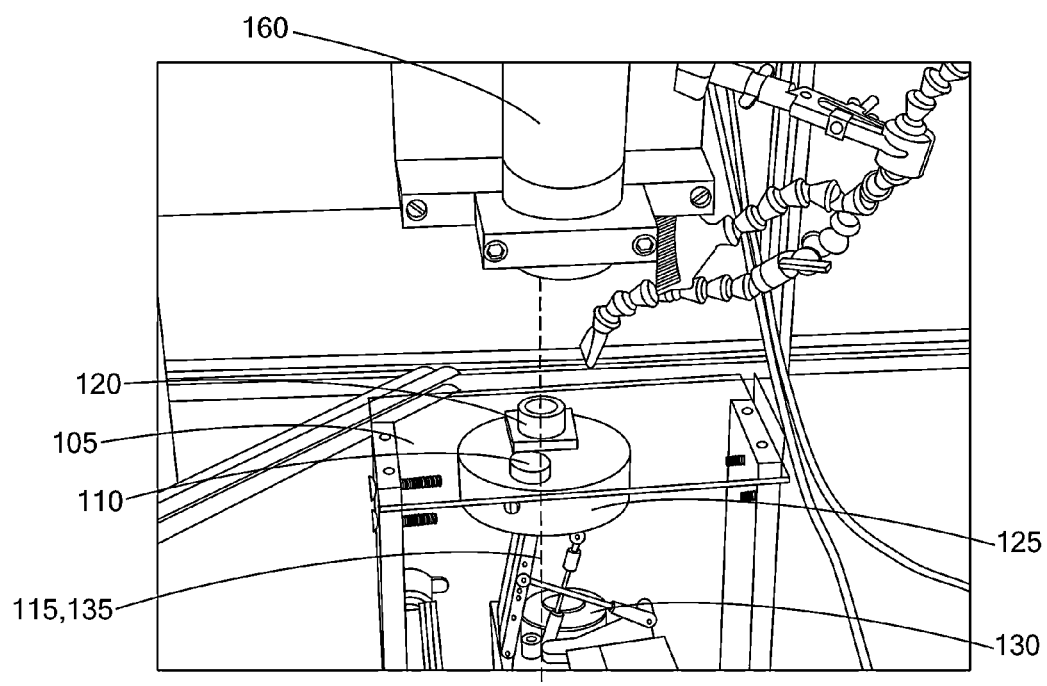
FIG. 2 is a view of an exemplary apparatus for materials processing according to the present disclosure.
Figure 3:
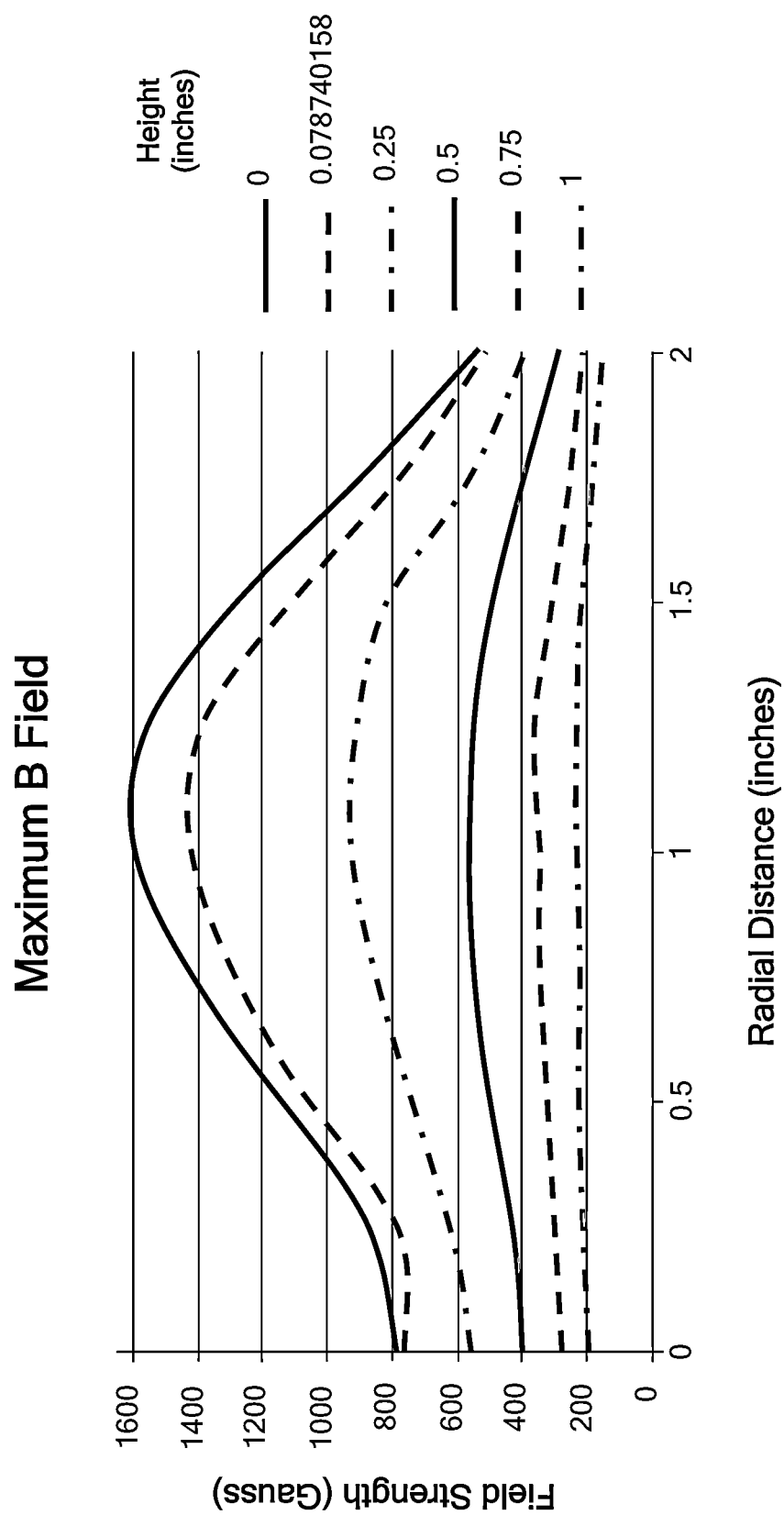
FIG. 3 is a plot of field strength as a function of radial distance (from the center of rotation) for an exemplary set up of the materials processing apparatus.

Referring to FIGS. 1 and 2, an apparatus 100 for materials processing comprises a platform 105 for supporting a specimen, and a plurality of magnets 110 underlying the platform 105. In the exemplary apparatus shown in FIGS. 1 and 2, two magnets are shown. The plurality of magnets 110 are configured for rotation about an axis of rotation 115 intersecting the platform 105. A heat source 160 is disposed above the platform 105 for heating the specimen as the plurality of magnets 110 are rotated.

A method for materials processing that may utilize the apparatus 100 shown in FIGS. 1 and 2 entails providing a specimen 120 on a support platform 105 overlying a plurality of magnets 110, and rotating the plurality of magnets 110 about an axis of rotation 115 intersecting the platform 105. A rotating magnetic field is thereby applied to the specimen. While rotating the plurality of magnets 110, the specimen 120 is heated to a desired temperature. The specimen may be heated to the desired temperature at a high rate, for example, at least about 100° C./min, or even higher (e.g., at least about 1000° C./min). The rotating and the heating may be carried out at the desired (maximum) temperature very rapidly depending on the speed of rotation of the magnets, the number of magnets, and their angular distribution. For example, the method may be carried out for a time duration of about 5 minutes or less, about 2 minutes or less, about 1 minute or less, or about 30 seconds or less. Generally, the time duration is at least about 50 milliseconds, or at least about 1 second.

During the heating and the application of the rotating magnetic field, the specimen (and/or the platform on which the specimen is positioned) may be moved with respect to the heat source and/or the rotating magnets. For example, the platform supporting the specimen may be translated in one or more directions during the process. It is also contemplated that the specimen may be configured such that it serves as both the specimen and a support platform. For example, in a roll-to-roll processing scheme, the specimen may be a sheet held under tension by two rolls. In such a configuration, where an external force is applied to the sheet to maintain its position, the sheet is both the specimen and the support platform. This is also an example in which the specimen and support platform (i.e., the sheet under tension) are moved (translated) with respect to the heat source and the rotating magnets during processing.

The plurality of magnets 110 used to apply the rotating magnetic field may be disposed on a holder 125 connected to a motor 130 by a shaft 135 defining the axis of rotation. There may be two or more magnets, three or more magnets or four or more magnets, for example. The number of magnets used and their position may be influenced by the size of the magnets and the desired magnetic field. It is contemplated that the apparatus may include as many as five or more magnets, or eight or more magnets.

Generally, the magnets 110 may be disposed in a symmetric configuration about the axis of rotation. For example, the magnets may be situated along the circumference of an imaginary circle concentric with the axis of rotation. The magnets may be disposed equidistant from each other. For example, two magnets may be situated approximately 180° from each other, whereas three magnets may be situated approximately 120° from each other, and four magnets may be situated approximately 90° from each other. Other asymmetric configurations are also possible. The radius of the imaginary circle may be determined by the size of the magnets and/or the size of the specimen to be processed, and may vary over a large range. For example, the radius may range in size from about 1 cm to about 500 cm, or from about 1 cm to about 100 cm. Accordingly, the magnets may be spaced apart from each other by a distance of from about 2 cm to about 1000 cm, or from about 2 cm to about 200 cm, where a line measuring the distance between the magnets passes through the center of the imaginary circle. The magnets may also be placed at multiple concentric imaginary circles at different radii from the axis of rotation.

The radii of the one or more imaginary circles may be larger than, smaller than, or about the same as the lateral extent of the specimen. The specimen may be positioned at or near the center of the imaginary circle(s) so as to overlap with the point at which the axis of rotation intersects with the platform. Alternatively, it may be advantageous for the specimen to be positioned a radial distance from the center of the imaginary circle(s) so that the applied field strength is maximized, as discussed further below in reference to FIGS. 3-6. Typically, the axis of rotation is substantially perpendicular to the platform, e.g., within ±1° of perpendicular to the platform.

Suitable magnets for the apparatus include permanent magnets, such as those comprising a rare earth element. For example, the magnets may comprise Nd—Fe—B or Sm—Co. Typically, the magnets are from about 1 cm to about 100 cm or from about 1 cm to about 20 cm in lateral size (e.g., diameter) and from about 1 cm to about 10 cm in thickness. The magnets are typically rotated at a speed of from about 60 rpm to about 10,000 rpm, and the rotation speed may also be between about 1,000 rpm and about 7,000 rpm, or between about 2,000 rpm and about 6,000 rpm. Accordingly, the rotating magnetic field produced by the rotating magnets may have a frequency of from about 1 Hz to about 1500 Hz. Generally, the rotating magnetic field has a frequency of at least about 1 Hz, at least about 20 Hz, at least about 50 Hz, at least about 100 Hz, at least about 250 Hz, or at least about 500 Hz. The frequency may also be about 1500 Hz or less, about 1000 Hz or less, about 800 Hz or less, about 600 Hz or less, about 400 Hz or less, or about 200 Hz or less.

The magnets may be mounted having the same or alternating polarity. If the magnets are all mounted with same polarity, then the rotation may result in a cyclic field variation from 0 to 10,000 gauss (G). If the magnets are mounted with alternating polarity, then the rotation may result in a cyclic field variation from −10,000 to +10,000 G. When the magnets are mounted with an alternating polarity, an even number of magnets is preferably used, and the frequency of the rotating magnetic field is halved. For example, with six magnets (three pairs) mounted with alternating polarity and rotation speeds up to 10,000 rpm, the resulting frequency of the rotating magnetic field is up to 500 Hz.

The rotating magnetic field generated by the magnets may have a field strength of from about 100 G to about 10,000 G. The rotating magnetic field may also have a field strength of from about 500 G to about 2000 G. The field strength experienced by the specimen depends on the positioning of the specimen with respect to the magnets, as shown by the data of FIGS. 3-6. The field strength is at a maximum at a radial distance from the center of the imaginary circle corresponding to the radial position of the magnets. In the exemplary set-up of FIG. 3, for example, the maximum field strength reaches about 1600 Gauss (depending on the height of the specimen above the magnets) at a radial distance of about 1.1 inches, which corresponds to the radial position of the magnets.

Figure 4:
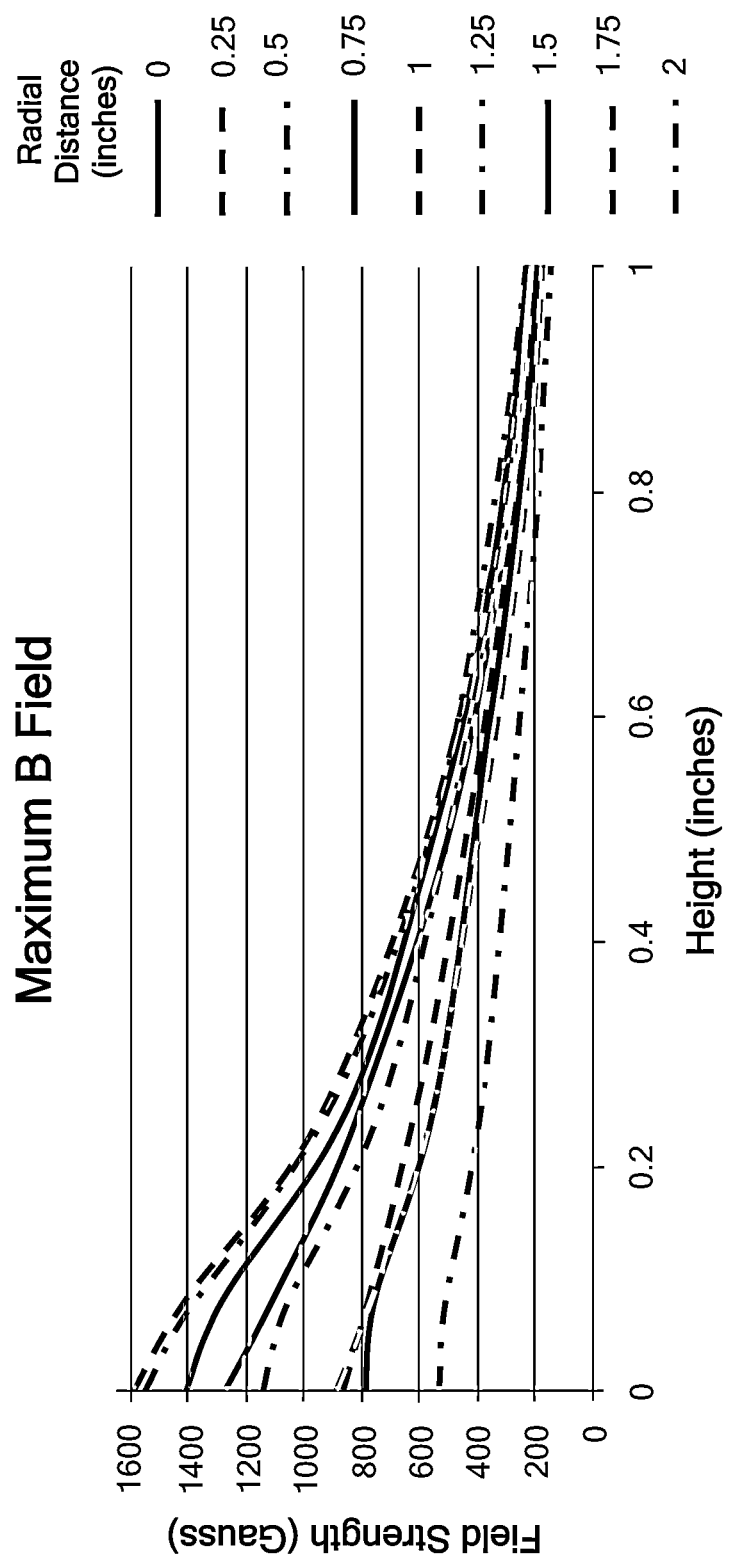
FIG. 4 is a plot of strength as a function of height above the specimen platform for an exemplary set-up of the materials processing apparatus.
Figure 5:
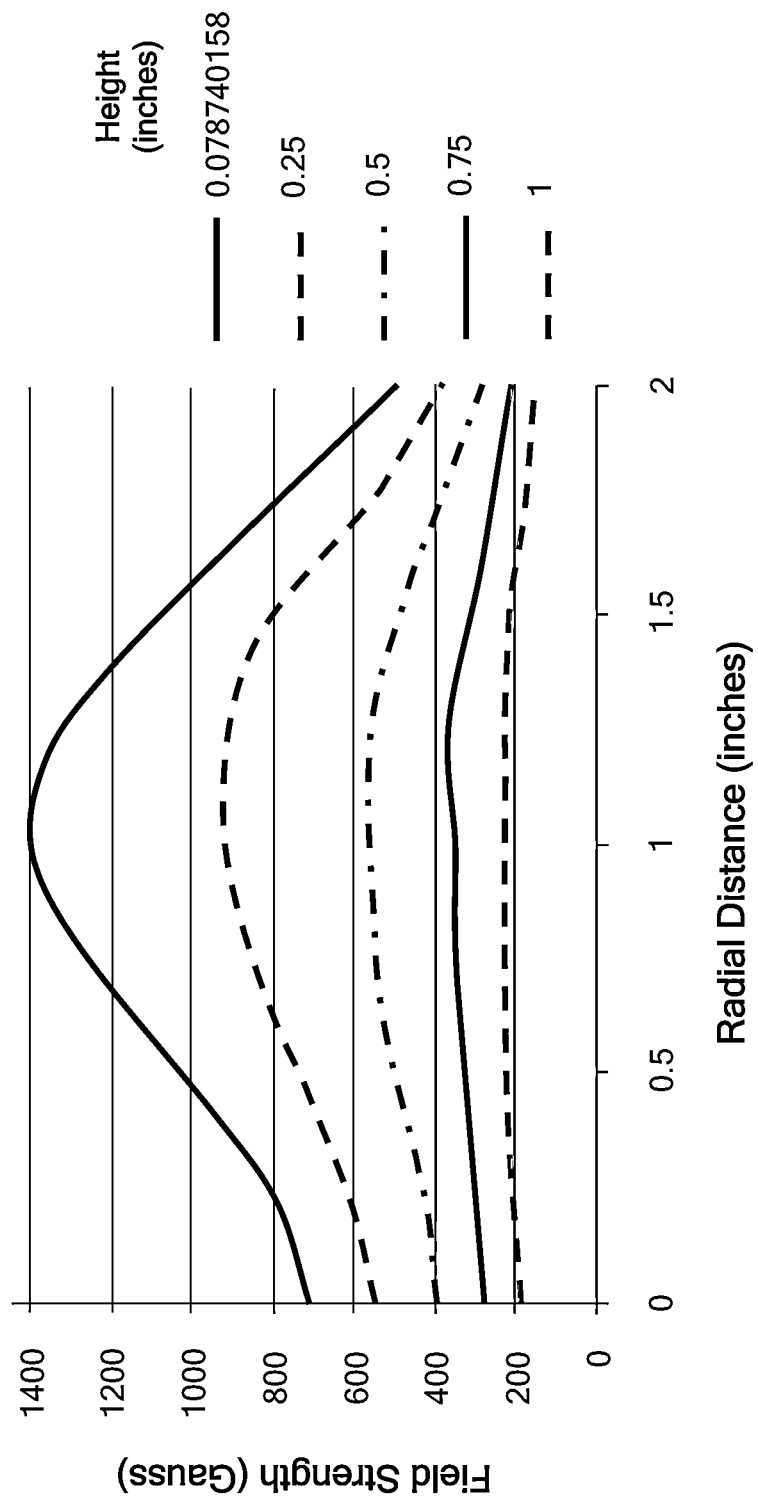
FIG. 5 is a plot of strength as a function of radial distance from the center of rotation an exemplary set-up of the materials processing apparatus in which a steel substrate supports the specimen to be processed.
Figure 6:
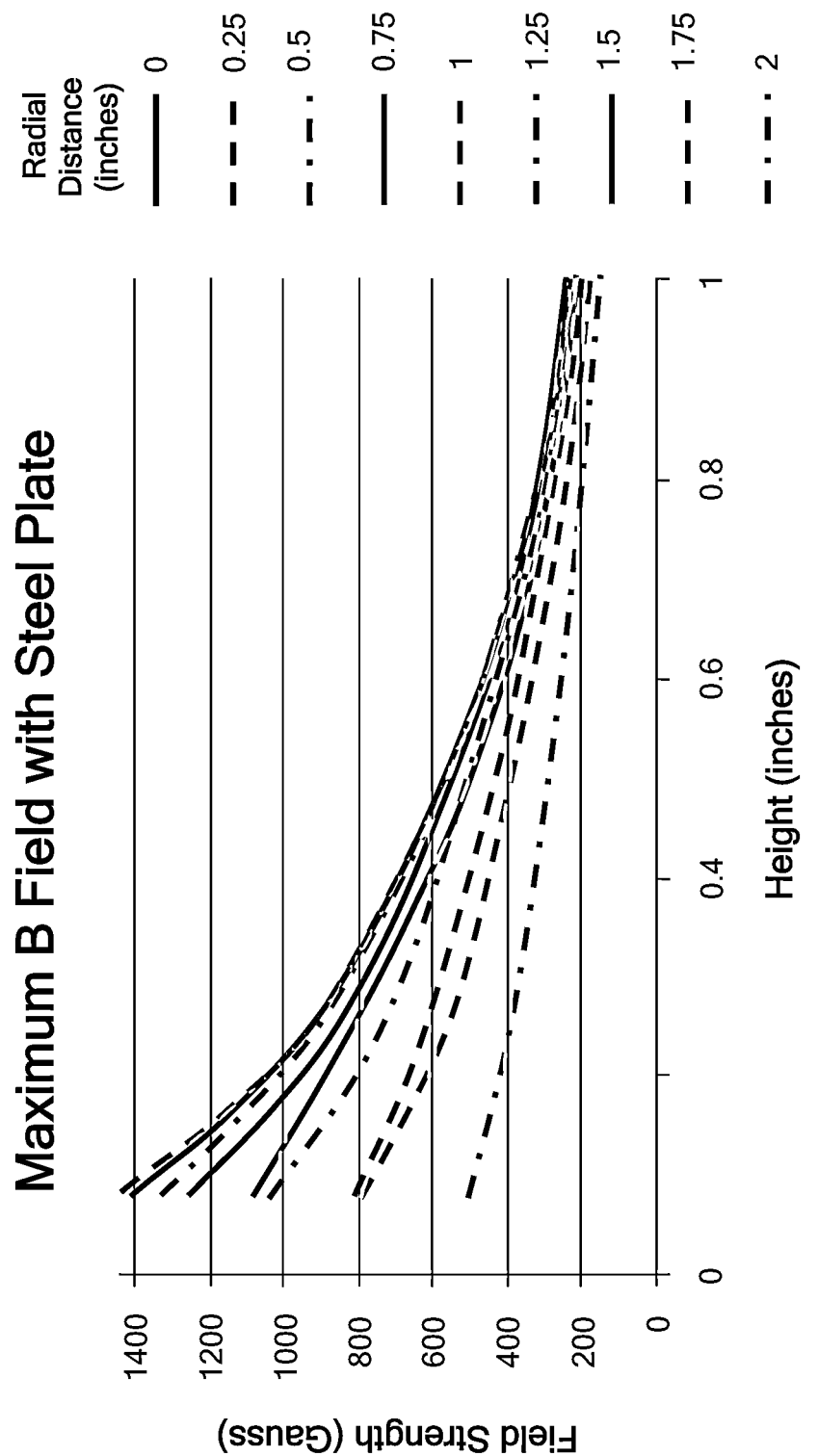
FIG. 6 is a plot of strength as a function of height above the specimen platform for an exemplary set-up of the materials processing apparatus in which a steel substrate supports the specimen to be processed.

The field strength experienced by the specimen may be increased by minimizing the height of the specimen above the magnets. As shown in FIG. 4, the magnetic field strength is at a maximum at a height of 0, which corresponds to the level of the platform 105. Typically, the specimen platform is positioned at a minimum distance of 0.1 cm from the magnets. FIGS. 5 and 6 show the field strength as a function of radial distance and height, respectively, for applications in which the specimen comprises a steel substrate, such as in the examples described below.

The heat source may be a plasma arc lamp, a laser, or another source of infrared radiation. For example, a suitable laser is the Trumpf HL4006D laser, which includes a 4 kW 1064 nm continuous Nd:YAG beam connected to a fabricated brass water-cooled lens assembly. The operation of such a device is described further in the examples below. In another example, a suitable plasma arc lamp is a high density plasma arc lamp available at Oak Ridge National Laboratory, which is capable of power densities on the order of 20,000 W/cm$^2$ over broad areas and may be pulsed in 1 millisecond.

Figure 7:
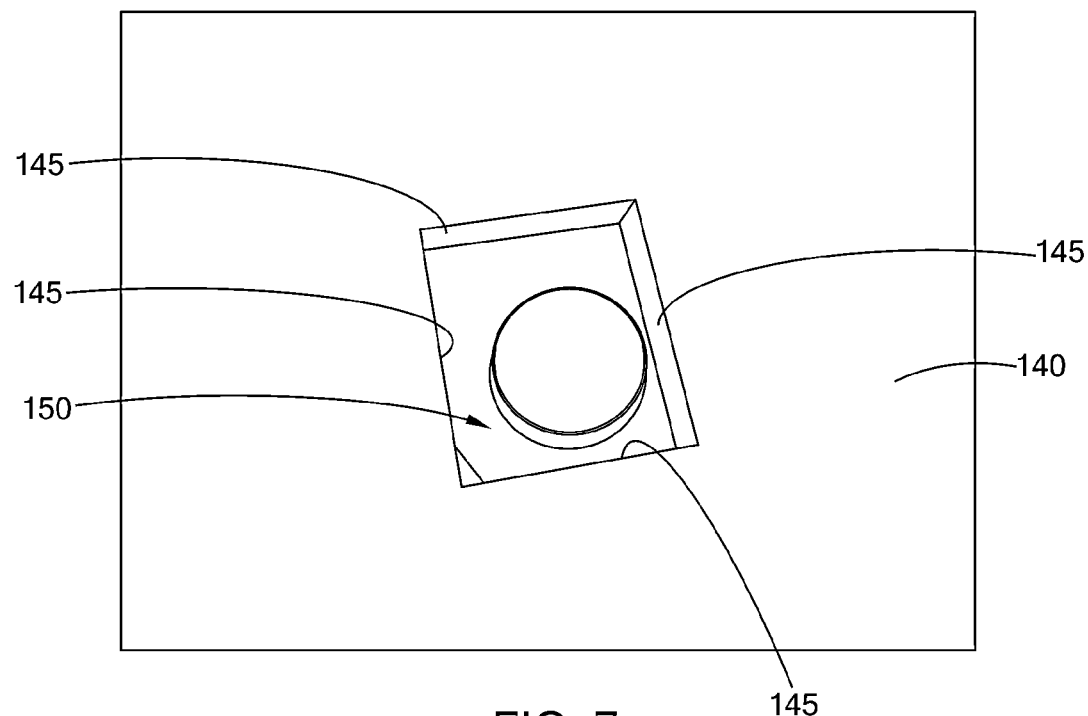
FIG. 7 shows a portion of an exemplary masking plate.

The desired temperature to which the specimen is heated may be greater than or equal to a melting temperature of the specimen, in some applications. Alternatively, the desired temperature may be less than the melting temperature of the specimen. The apparatus may further include a masking plate (see FIG. 7) between the heat source and the platform for focusing the heat more effectively on the sample and/or to avoid undesired heating of the specimen platform.

The specimen processed as described above using a combination of rapid heating and a rotating magnetic field may comprise, for example, a bulk solid sample, a liquid sample, or a thin film or thick film on a substrate (e.g., a metal substrate as described in the examples below). The thin or thick film may include one or more layers. The specimen may be made of a metal or alloy, ceramic, polymer or a composite of one or more of these materials. The specimen may include multiple components made of the same or different materials. Nanostructured and microstructured materials may benefit from the processing method described herein. The specimen and the platform may be stationary or may be moving in a steady manner as in a continuous processing scheme.

The method is particularly well suited for the magnetic processing of planar samples of a limited thickness (e.g., having a thickness of from about 1 nm to about 500 microns, from about 1 nm to about 100 microns, or from about 1 nm to about 1 micron). For example, a coating including nanoparticles may be processed using the apparatus to uniformly distribute the nanoparticles within the coating. During processing, the coating may be heated to the liquid state and then resolidified. The apparatus and method may also be used to influence sintering and/or crystallization of single layer or multilayer materials in the solid state. The method may also be employed for mixed solid-liquid processing, such as liquid phase sintering of solid particles. Other applications envisioned for the method include joining of materials that contain nanoparticles, and joining of dissimilar materials where one of the materials being joined cannot be heated directly to high temperatures, as discussed further below.

Example 1

Processing of Coatings Containing Nanoparticles

Rotating magnetic fields were employed to process coatings containing nanoparticles on steel substrates as well as bulk materials. The coatings were processed using the experimental configuration shown in FIGS. 1 and 2, and under the field strength conditions shown in FIGS. 5 and 6. The magnets were rotated at a speed of approximately 5300-5600 rotations per minute (rpm). The objective was to study the effectiveness of the electromagnetic fields in stirring the molten coating material, dispersing the nanoparticles, and achieving uniform spatial distribution of nanoparticles. Coatings were processed using heat from a plasma arc lamp and a focused laser system with and without electromagnetic fields.

The precursor coating material included a thin sheet of material containing predispersed oxide nanoparticles prepared at Oak Ridge National Laboratory. The composition of the base alloy for oxide dispersion strengthened (ODS) materials used in this project is given in Table 1.

TABLE 1

| Composition of matrix alloys used in ODS alloy preparation | | | | | | | | | |
|---|---|---|---|---|---|---|---|---|---|
| Alloy | Cr | C | Mn | W | V | Ta | Si | Y | Fe |
| LAF | 8.6 | 0.065 | 0.44 | 2.0 | 0.29 | 0.08 | 0.24 | 0 | Bal |

The initial set of experiments was performed with ODS alloys produced from this Fe—Cr base alloy blended with 1 wt. % $Y_2O_3$ and $TiO_2$ particles (25-35 nm in size) at a molar ratio of 1:1. The oxides were added and ball milled in a vacuum attriter mill for 96 hours. The milled powders were then encapsulated in a 51-mm diameter stainless steel can, degassed under vacuum at 400° C., and sealed in the can. The canned powders were extruded at 1150° C. through a 12.7 mm diameter die in one pass, resulting in a 16:1 reduction in area. The extruded rod was heat treated for 1 hour at 1050° C. and then air cooled, followed by a heat treatment for 1 hour at 750° C. followed by an air cool. Thin disks (0.1" thick) were machined from the rod specimen and used as the material to be fused to a steel substrate. For comparison, thin disks were also prepared from consolidated and extruded as-received powders and used for fusing with a steel substrate.

Coatings processed with and without electromagnetic fields were characterized using optical microscopy and scanning electron microscopy to study the sizes of particles present and their spatial distribution. Differences in spatial distribution of oxide dispersions and the tendency for agglomeration were evaluated, and the feasibility of concept to achieve the desired spatial distribution was evaluated.

FIG. 2 shows the magnetic processing apparatus under an optical heat source. A disc-shaped specimen which is to be melted to form a coating is placed on a substrate, which is then placed on a supporting plate. Rotating electromagnetic fields are applied to the specimen by the rotating magnets while the specimen is heated from above by an optical source, such as a plasma arc lamp or a laser heat source.

Figure 8:
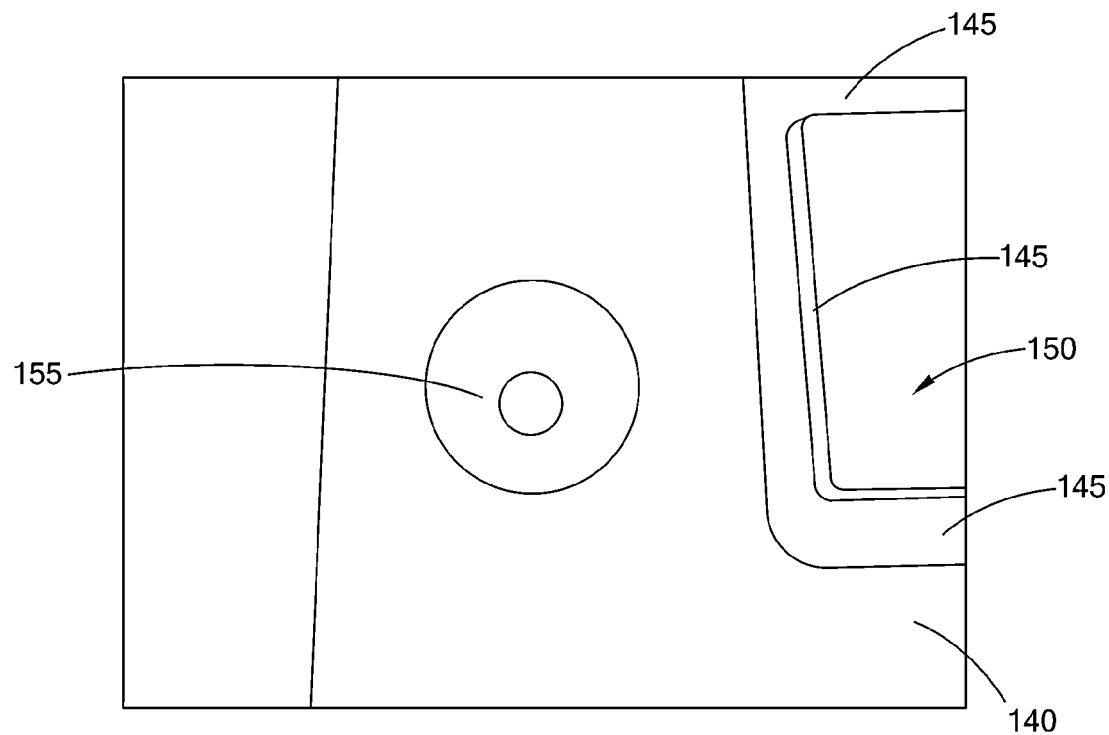
FIG. 8 shows a portion of an exemplary masking plate including a countersunk hole.

The high density plasma arc lamp employed for the experiments is capable of power densities on the order of 20,000 W/cm$^2$ over broad areas (currently up to 1,000 cm$^2$) and the lamp can be pulsed in 1 millisecond. This lamp was used to process nanoparticle-containing coatings in the presence of time varying magnetic fields. A masking plate may further be employed to prevent the plasma arc lamp from heating regions outside of the specimen and thus providing insufficient heat to the specimen. Design modifications were employed to increase the heat incident on the specimen from the plasma arc lamp. For example, to prevent heat from the plasma arc lamp from being shielded by steep walls 145 on the masking plate 140, a step was cut into the walls 145 of the rectangular hole 150 so that shadowing is minimized during processing. In addition, a countersunk hole 155 was bored in the masking plate 140, as shown in FIG. 8, minimizing the area of the substrate exposed to the lamp and concentrating the heat on the coating precursor specimen. The specimen was placed in the region of the countersunk hole for processing. The metallic masking plate was ultimately replaced by an alumina masking plate to increase its heat resistance.

In another set of experiments, a focused laser system was used to selectively heat and melt the nanoparticle-containing material on top of a substrate. The laser employed was a Trumpf HL4006D with a 4 kW 1064 nm continuous Nd:YAG beam connected to a fabricated brass water-cooled lens assembly. The laser beam diverges from the 600 μm fiber into the focusing optics at an angle of 25 mRad. The beam is then passed through a series of 3 lenses housed in a custom water cooled brass fixture. The divergent beam is translated into a parallel round beam by a plano-convex lens at a predetermined distance from the tip of the fiber. The beam is focused in the direction perpendicular to its travel direction by a plano-concave lens, and is focused again in the direction parallel to its travel direction by another plano-concave lens placed in relation to the previous lens. The beam then travels through a clear protective slide, and makes contact with the sample. When focused, the approximate dimensions of the beam are 1 mm×10 mm. The laser beam scans continuous offset tracks horizontally across the surface of the sample until the full surface is processed.

Figure 9:
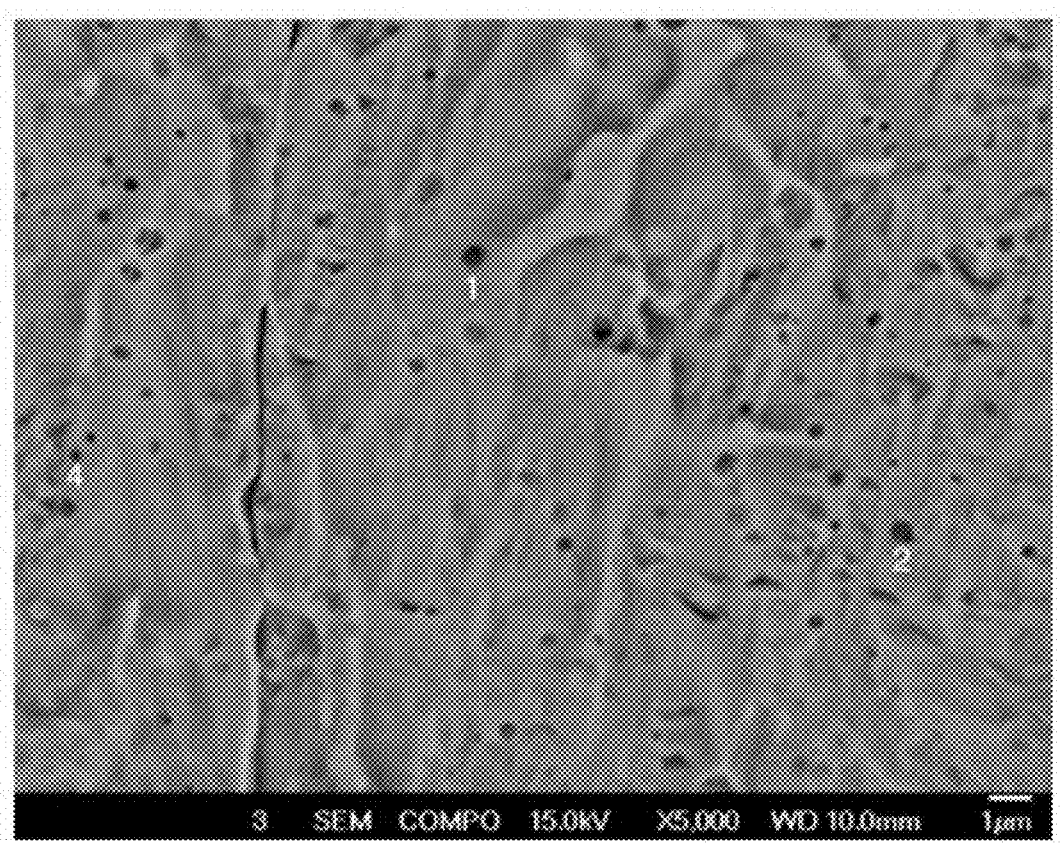
FIG. 9 shows scanning electron microscope (SEM) image of a coating processed in the presence of a rotating electromagnetic field.

FIG. 9 shows a scanning electron microscope (SEM) image of a coating processed in the presence of a rotating magnetic field. As shown in the image, numerous oxide dispersions of about a few 100 nm (dark/gray phase) or smaller are clearly observed within the processed region.

Example 2

Joining of Components/Materials

As mentioned above, the present method may be used for the joining of materials that contain nanoparticles, and/or for the joining of components comprising the same or dissimilar materials, particularly in the case where one of the materials being joined cannot be heated directly to high temperatures.

Figure 10:
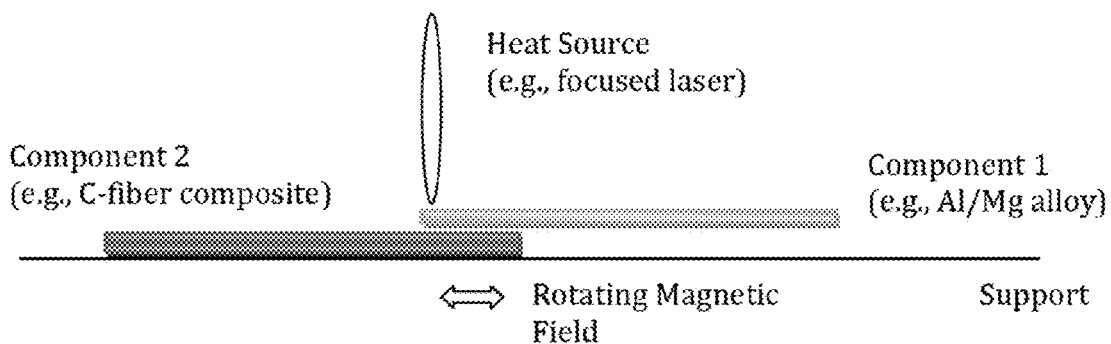
FIG. 10 shows a schematic an exemplary process in which two components comprising different materials are joined by the present method in a lap/super-lap joint configuration.

There is significant interest in joining aluminum and magnesium alloys to carbon fiber-resin matrix composites for automotive light-weighting. The present method may be applied to join components comprising these materials. Three different types of joints can be fabricated: a lap/super-lap joint, a butt joint, and a tube-in-tube joint. FIG. 10 shows, in cross-section, the principle behind the concept for preparing a bond, which may be referred to as a fusion bond, between a component comprising an aluminum or magnesium alloy and a component comprising a carbon fiber using the present method. The rotating magnetic field may improve fluid flow and mixing during the bonding process.

Figure 11:
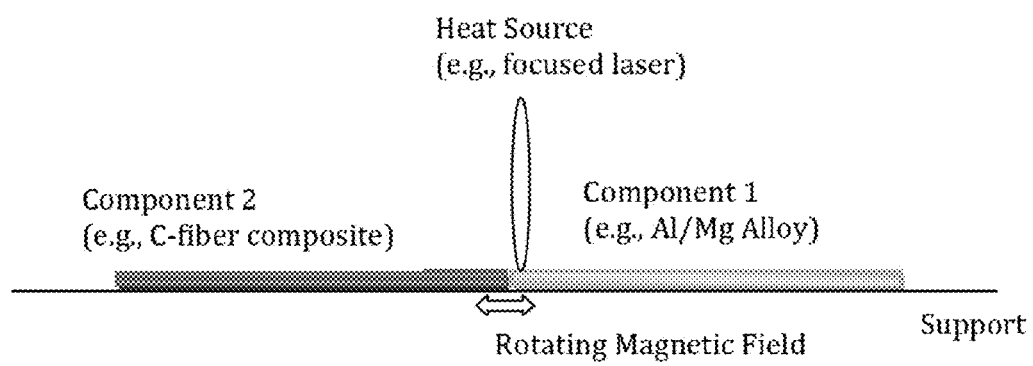
FIG. 11 shows a schematic of an exemplary process in which two components comprising different materials are joined by the present method in a butt joint configuration.

An aluminum/magnesium alloy plate may be held at a small distance of separation (gap) from the carbon-fiber composite. A heat source such as a laser is allowed to rapidly heat and melt a small region of the alloy plate and the rotating magnetic field may force liquid metal into the gap between the alloy plate and the carbon-fiber composite. The heat source may be scanned across the surface of the alloy plate in one or both directions to achieve an extended region of bonding. FIG. 11 shows a schematic of a butt joint that may be prepared using a similar process, and FIG. 12 shows a tube-in-tube geometry for a similar process.

Figure 12:
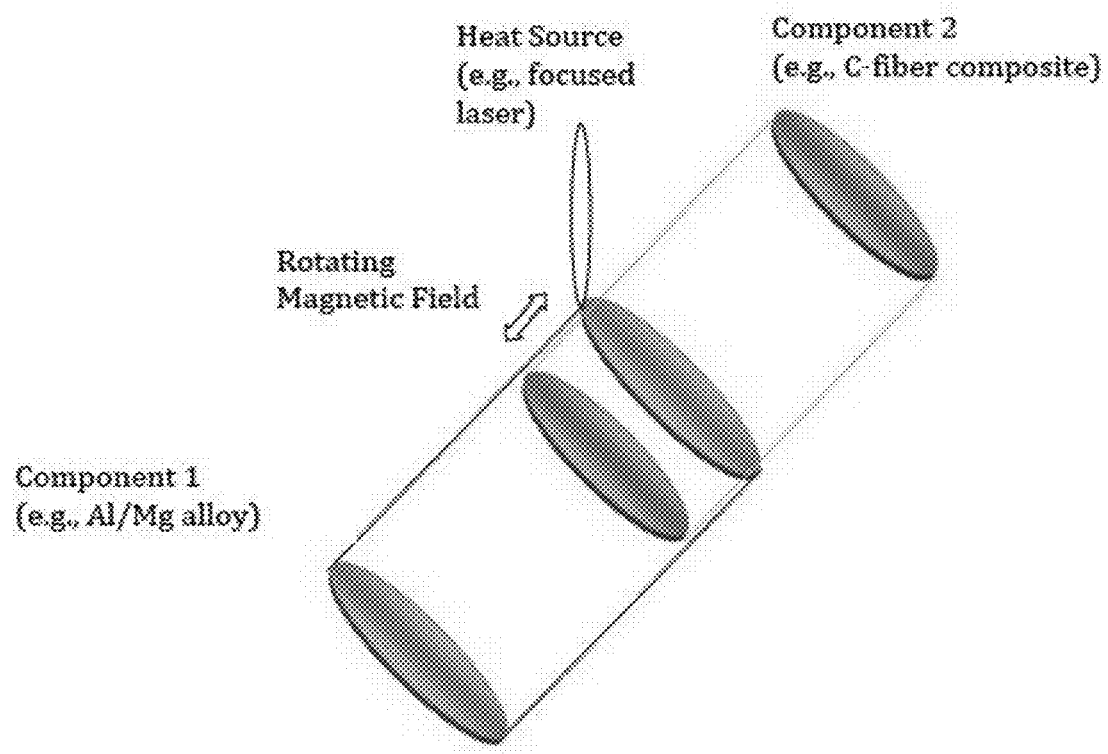
FIG. 12 shows a schematic of an exemplary process in which two components comprising different materials are joined by the present method in a tube-in-tube joint configuration.

A careful study of FIGS. 10-12 show that, in all these cases, the high power laser may not need to directly deposit any energy onto the carbon fiber composite. It should be noted that in FIG. 12, where a workpiece includes a carbon fiber composite tube having an end inside of an alloy tube, the laser is directed on to an outer wall of the alloy tube and not onto the carbon fiber composite tube. Either the workpiece or the laser is rotated to cover the entire circumference of the tube. The orientation of the tubes may not be vertical to help gravity assist in the process of wetting and flow. In addition to this, the joining surface of the carbon fiber composite tube can be serrated to enable a physical interlocking mechanism for increased bond strength. This may increase the strength of the interface, if required.

The plasma arc lamp described above may be employed as the heat source. In this case, a relatively large area of the sample can be heated rapidly to the melting point of the aluminum/magnesium alloy, while protecting the other regions from the lamp using shielding techniques. This may promote rapid melting and intermixing between the liquid metal and the carbon fibers. The advantage with this technique is that a large area of the sample can be processed at any given time.

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein. Furthermore, the advantages described above are not necessarily the only advantages of the invention, and it is not necessarily expected that all of the described advantages will be achieved with every embodiment of the invention.

It is to be understood that the different features of the various embodiments described herein can be combined together. It is also to be understood that although the dependent claims are set out in single dependent form the features of the claims can be combined as if the claims were in multiple dependent form.

The invention claimed is:

1. A method for materials processing utilizing a rotating magnetic field, the method comprising:
    providing a specimen comprising two components placed adjacent to each other on a platform overlying a plurality of magnets, a first of the two components comprising an aluminum or magnesium alloy and a second of the two components comprising a carbon fiber-resin matrix composite;
    rotating the plurality of magnets about an axis of rotation intersecting the platform, thereby applying a rotating magnetic field to the specimen; and
    while rotating the plurality of magnets, heating the specimen to a desired temperature greater than or equal to a melting temperature of the aluminum or magnesium alloy,
    wherein the two components are bonded together during the heating and the application of the rotating magnetic field.

2. The method of claim 1, wherein the magnets are rotated at a speed of from about 60 rpm to about 10,000 rpm.

3. The method of claim 1, wherein the rotating magnetic field applied to the specimen has a field strength of from about 100 G to about 10,000 G.

4. The method of claim 1, wherein the rotating magnetic field has a frequency of from about 1 Hz to about 1500 Hz.

5. The method of claim 1, wherein the specimen and the platform are translated with respect to the plurality of magnets during the rotating and heating.

6. The method of claim 1, wherein the specimen comprises a film on a substrate.

7. The method of claim 6, wherein the film comprises a plurality of nanoparticles dispersed therein.

8. The method of claim 1, wherein, during the heating, only a portion of the specimen is heated to the desired temperature.

* * * * *